United States Patent [19]
Son et al.

[11] Patent Number: 5,745,471
[45] Date of Patent: Apr. 28, 1998

[54] DEVICE FOR DAMPING VIBRATIONS OR SHOCKS IN AN OPTICAL DISK PLAYER

[75] Inventors: Jin Seung Son, Seoul; Gyu Chool Kim, Suwon; Jung Hun Pang, Seoul, all of Rep. of Korea

[73] Assignee: Samsung Electronics Co., Ltd., Suwon, Rep. of Korea

[21] Appl. No.: 725,892

[22] Filed: Oct. 2, 1996

Related U.S. Application Data

[63] Continuation of Ser. No. 503,799, Jul. 18, 1995, abandoned, which is a continuation of Ser. No. 222,923, Apr. 5, 1994, abandoned.

[30] Foreign Application Priority Data

Jul. 13, 1993 [KR] Rep. of Korea ............... 93/13134

[51] Int. Cl.$^6$ ....................................... G11B 33/08
[52] U.S. Cl. .............................. 369/263; 369/247
[58] Field of Search ........................ 369/246, 247, 369/263, 248; 248/609, 636

[56] References Cited

U.S. PATENT DOCUMENTS

| | | | |
|---|---|---|---|
| 4,794,588 | 12/1988 | Yoshitoshi et al. | 369/263 |
| 4,841,499 | 6/1989 | Takahashi et al. | 369/263 |
| 5,379,990 | 1/1995 | Ando et al. | 369/247 |

FOREIGN PATENT DOCUMENTS

| | | | |
|---|---|---|---|
| 703177 | 4/1931 | France | 369/263 |
| 63-114492 | 7/1988 | Japan . | |
| 4-157691 | 5/1992 | Japan | 369/247 |
| 5-325527 | 12/1993 | Japan | 369/263 |
| 1399525 | 7/1975 | United Kingdom | 369/263 |

*Primary Examiner*—Stuart S. Levy
*Assistant Examiner*—David L. Ometz
*Attorney, Agent, or Firm*—Burns, Doane, Swecker & Mathis, L.L.P.

[57] ABSTRACT

A device for damping vibrations or shocks in an optical disk player has an external housing; a deck housing located in the external housing, each of two side walls of the deck housing having a plurality of holes; at least a pair of support brackets attached to the external housing to maintain a specified space against each side wall of the deck housing, each support bracket having a plurality of holes corresponding to the holes in the two side walls of the deck housing; and, a plurality of vibrations damping members for damping vibration, the vibrations damping members formed of an elastic material, and inserted between each of the corresponding holes in the deck housing and support brackets. The vibrations damping member is formed by an elastic container with fluid to the extent that the internal pressure of the container exceeds the standard atmospheric pressure.

9 Claims, 2 Drawing Sheets

DEVICE FOR DAMPING VIBRATIONS OR SHOCKS IN AN OPTICAL DISK PLAYER

This application is a continuation of application Ser. No. 08/503,799, filed Jul. 18, 1995, now abandoned which, in turn, is a continuation of U.S. application Ser. No. 08/222,923, filed Apr. 5, 1994, now abandoned.

BACKGROUND OF THE INVENTION

1. Field of the Invention

The present invention is related to a device for damping vibrations or shocks in an optical disk player, particularly to a device for damping vibrations or shocks in a car-mounted optical disk player and the like, by a configuration in which dampers are forcibly inserted between a deck housing and support brackets.

2. Description of the Prior Art

Recently, various portable or car-mounted optical disk players have been developed. An optical disk player commonly incorporates a position detecting and compensating device, which may help the player to operate normally, even when the disk to be played has some deviations or when a slight shock or vibration is applied to the player.

However, the position detecting and compensating device can perform its function only when the player is in a basically stable environment. Accordingly, the optical disk player which is designed to be used in an unstable environment such as in a car, requires an additional device for damping vibrations or shocks caused by the external environment.

FIG. 1 is a cross-sectional view of an optical disk player with a conventional vibrations damping device, and FIG. 2 is an enlarged view of a portion of "A" in FIG. 1.

Referring to FIG. 1, reference numeral 10 denotes an external housing, and reference numeral 20 denotes a deck housing to which an optical disk drive unit (not shown), a data readout unit (not shown), and the like are mounted. Deck housing 20 is elastically attached to a support bracket 30 by means of an vibrations damping device.

On the other hand, the vibrations damping device shown in FIG. 2 comprises a damper 40 for damping vibrations or shocks caused by the external environment, a damper bracket 60 for securing the damper 40 to the support bracket 30, a spring 50, and a pin member 70.

The interior of the damper 40 is filled with a fluid such as oil. A coupling recess is located at the center portion of the damper 40. The pin member 70 is attached to the exterior wall of the deck housing 20, and inserted into the coupling recess of the damper 40 so that the deck housing 20 is supported by the support bracket 30. The spring 50 is placed around the coupling portion of damper 40 and damper pin 70.

In the afore-mentioned configuration, damper 40 reduces any vibrations transmitted to the deck housing 20 in a short period of time, and it reduces the vibrations by means of the absorbing characteristic of the fluid filled therein. However, when the optical disk player is stationary and vibrations do not occur, the deck housing 20 sags due to the force of gravity because the rigidity of the damper 40, without spring 50, is insufficient to support the deck housing 20. The deck housing 20 may thus be additionally supported by the supporting force of the spring 50 placed around the coupling portion of the damper 40 and damper pin 70.

However, the conventional vibrations damping device described above has problems in that the configuration of the device is complicated and the manufacturing costs increase due to the excessive number of parts and because it is difficult to assemble the conventional vibrations damping device.

On the other hand, another device having a configuration similar to that of the conventional vibrations damping device is disclosed in Japanese Utility Model Laid-Open Sho 63-114492/1988. The device disclosed in the Japanese official gazette has an advantage, when compared to the conventional device, in that the general configuration and assembly process is simplified because of the elimination of the spring member as shown in the device in FIG. 1. However, the device has a fundamental problem in that the configuration of the device and the assembly process is complicated.

SUMMARY OF THE INVENTION

It is an object of the present invention to provide a device for damping vibrations or shocks in an optical disk player, where the configuration is simple, the number of parts is few, and the assembly process is convenient.

In order to achieve the object, the device for damping vibrations or shocks in an optical disk player comprises an external housing; a deck housing located in the external housing, each of the two side walls of the deck housing having a plurality of holes; at least a pair of support brackets supported on the external housing to maintain a specified space against each of the two side walls of the deck housing, respectively, each support bracket having a plurality of holes corresponding to the holes in each of the two side walls of the deck housing; and, a plurality of vibrations damping members for damping vibrations, the vibrations damping members formed of an elastic material, and inserted between holes of the deck housing and corresponding holes of the support brackets.

In the afore-mentioned configuration, the vibrations damping member (hereinafter, called a damper) is formed by filling an elastic container with gas so that the internal air pressure of the damper exceeds the standard atmospheric pressure. Alternatively, the damper is also made by filling an elastic container with a viscous or non-viscous fluid so that the damper is slightly expanded. The damper may be embodied in various forms, such as a globular form, oval form, or the like in order to correspond the shape of the holes formed in the deck housing and support brackets.

Furthermore, by forming a concave member around each hole in the deck housing and support brackets, the dislocation of the damper from the holes may be effectively prevented. In this embodiment, by applying an adhesive to each contact surface of the damper and concave member, the dislocation of the damper from the holes may be securely prevented.

Alternately, by forming a plurality of grooves in the body of the damper instead of forming the concave member around each hole in the deck housing and support brackets, and coupling each groove with a corresponding hole in the deck housing and support brackets, the dislocation of the damper from the holes may be effectively prevented.

BRIEF DESCRIPTION OF THE DRAWINGS

These and other aspects of the present invention are clarified in the accompanying drawings in which.

DETAILED DESCRIPTION OF THE PREFERRED EMBODIMENTS

Hereinafter, a device for damping vibrations or shocks in an optical disk player according to the present invention will be described in detail in reference to the accompanying drawings.

Prior to the detailed description, it is noted that the vibration damping device according to the present invention is preferably applicable to an optical disk player which is designed to horizontally introduce the optical disk.

Figure 1:
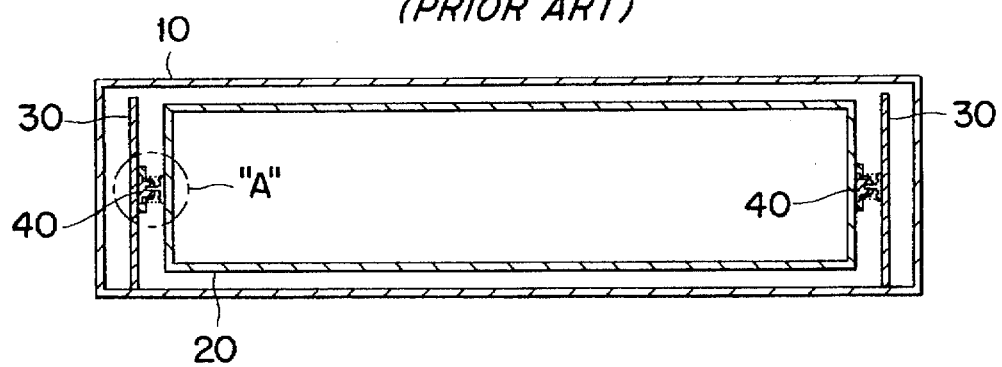
FIG. 1 is a cross-sectional view of an optical disk player with a conventional vibrations damping device.
Figure 2:
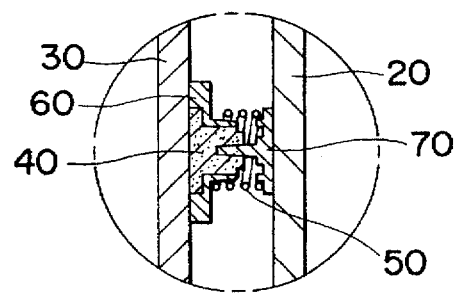
FIG. 2 is an enlarged view of portion "A" in FIG. 1.
Figure 3:
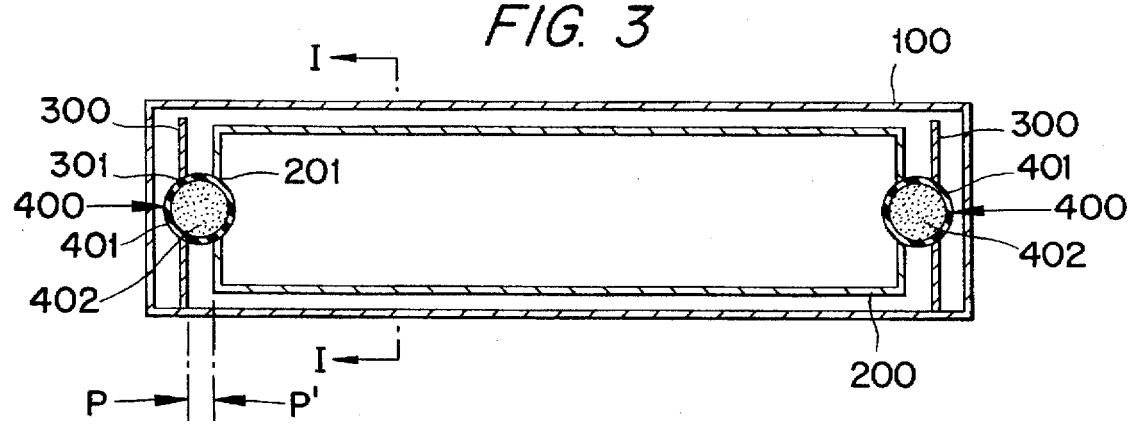
FIG. 3 is a cross-sectional view of an optical disk player with a novel vibration damping device according to the invention.
Figure 4:
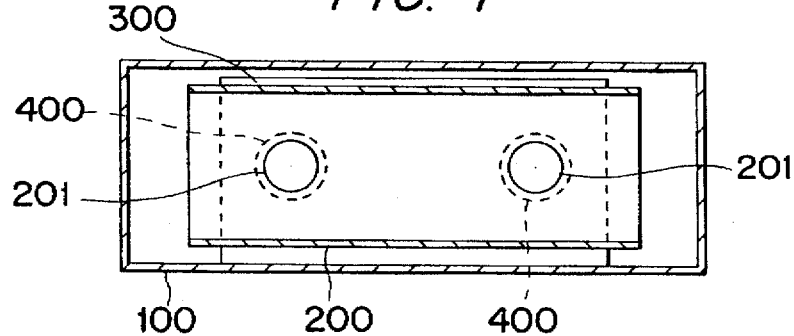
FIG. 4 is a sectional view taken along line I—I in FIG. 2.
Figure 5:
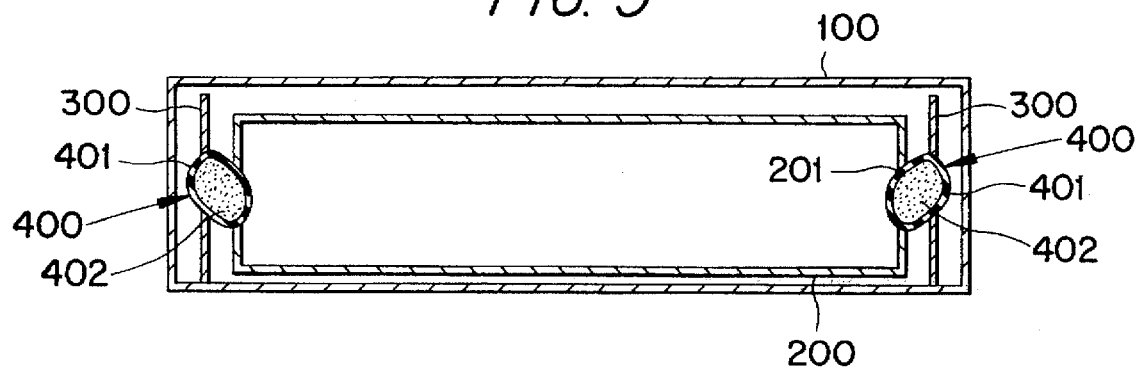
FIG. 5 is a cross-sectional view showing the operation of the vibration damping device of the present invention when the vibrations occur.

FIG. 3 is a cross-sectional view of an optical disk player with a novel vibration damping device according to the invention, FIG. 4 is a sectional view taken along line I—I in FIG. 2, and FIG. 5 is a cross-sectional view showing the operation of the vibration damping device of the present invention when the vibrations occur.

Referring to FIGS. 3 and 4, reference numeral 100 denotes the external housing of the optical disk player, and reference numeral 200 denotes the deck housing to which a disk drive unit (not shown) and a data readout unit (not shown), that is, a pickup unit, are mounted. Two coupling holes 201 are located in the center portion of each of two side walls of the deck housing 200. The number of the coupling holes 201 may be appropriately increased when necessary.

A pair of support brackets 300 define walls and are secured to the interior bottom surface of the external housing 100 so that they face each other. Two coupling holes 301, which respectively correspond to the holes 201 in each side wall of the deck housing 200, are located in each support bracket 300.

Damper 400, which is subsequently described, is inserted between each of the corresponding holes 201 and holes 301.

The damper 400 may be formed by filling a container 401 formed of an elastic material with a fluid such as gas 402 as nitrogen so that the internal pressure of the container 401 exceeds the standard atmospheric pressure. The damper 400 may also be formed by filling the container 401 with fluid such as a viscous or non-viscous liquid 402 such as water or silicon oil so that the container is slightly expanded. The damper 400 may be embodied in various forms, such as a globular form, oval form, or the like in order to correspond to the form of the holes 201 and 301 formed in the deck housing 200 and support brackets 300. The diameter of the damper 400 is larger than that of the holes 201 and 301.

A butyl rubber, with a highly dense structure with a low permeability, may be preferably used as the material of the container 401.

The liquid 402 is disposed on opposite horizontal sides of a plane P defined by an inner surface of each of the bracket walls 300, and on opposite horizontal sides of a plane P' defined by an outer surface of each of the side walls of the deck housing, as shown in FIG. 3.

In the afore-mentioned configuration, the assembly of the device may be performed by the following steps: (1) aligning the respective damper 400 with the respective hole 301 of each support bracket 300; (2) aligning the respective hole 201 formed in one side wall of the deck housing 200 with each related damper 400 by applying an external force; (3) aligning the respective hole 201 formed in the other side wall of the deck housing 200 with each related damper 400 with a gradually reduced external force; and, (4) removing the external force.

When the assembly work is completed in the afore-mentioned manner, the deck housing 200 is suspended on the support brackets 300 by the damper 400, thereby maintaining a specified space between the top and bottom surfaces of the external housing 100. Not illustrated in FIGS. 3 and 4, the top surface of the deck housing 200 may be supplementarily supported by additional elastic members, for example, a plurality of coil-springs.

In the afore-mentioned configuration, when vibrations or shocks from an exterior source do not occur, the damper 400 is not transformed due to the elasticity of the container 401 and the internal pressure of the container 401. Accordingly, the deck housing 200 may be maintained in a stable state as shown in FIG. 3.

On the other hand, when vibrations or shocks from an exterior source occur, the damper 400 is instantaneously transformed by the movement of the deck housing 200 caused by the vibrations or shocks, as shown in FIG. 5. Next, a restoring force, which follows the transformation of the damper 400, is applied to the deck housing 200. Simultaneously, the fluid 402 irregularly moves in the container 401, so that the energy caused by the vibrations or shocks is dissipated by the movement of the fluid. When the amplitude of the vibrations of the deck housing 200 becomes excessive, the dislocation of the damper 400 out of the corresponding holes 201 and 301 is effectively prevented by the top and bottom walls of the external housing 100 as limiters for the movement of the deck housing 200.

Figure 6:
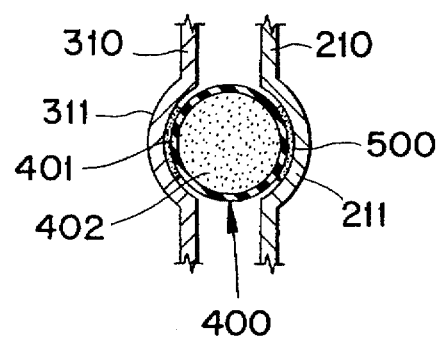
FIG. 6 is an enlarged view showing the vibration damping device according to the second embodiment of the present invention; and, FIG. 7 is an enlarged view showing the vibration damping device according to the third embodiment of the present invention.

FIG. 6 is an enlarged view showing the vibration damping device according to the second embodiment of the present invention.

Referring to FIG. 6, reference numeral 210 denotes a deck housing, reference numeral 310 denotes a support bracket, and reference numeral 400 denotes a damper. For convenience's sake, FIG. 6 shows only the portion related to the left side the deck housing 210.

Alternatively, by forming a concave portion 211 and 311 around each hole of the deck housing and support brackets according to the first embodiment, the dislocation of the damper 400 out of the holes 211 and 311 may be effectively prevented.

In this embodiment, by applying an adhesive member 500 to each contact surface of the damper 400 and each concave portion 211 and 311, the dislocation of the damper 400 out of the holes may be securely prevented.

Figure 7:
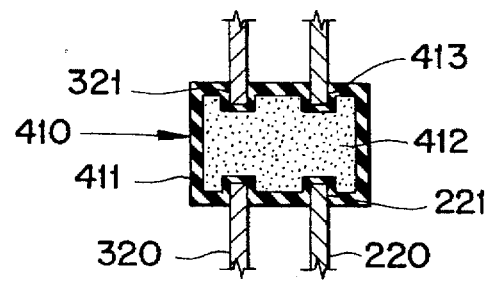

FIG. 7 is an enlarged view showing the vibration damping device according to the third embodiment of the present invention.

Referring to FIG. 7, reference numeral 220 denotes a deck housing, reference numeral 320 denotes a support bracket, and reference numeral 410 denotes a damper. For convenience's sake, FIG. 7 shows only the portion related to left side of the deck housing 220.

In the third embodiment, two grooves 413, which are to be corresponding to the holes 221 and 321, are formed in the body of the damper 410, instead of forming the concave portion 211 and 311 around each hole of the deck housing and support brackets as shown in FIG. 6. The coupling grooves 413 are coupled between the holes 221 and 321, thereby preventing the dislocation of the damper 410 from the holes 221 and 321.

The vibrations or shocks damping device described above is preferably applied to the car-mounted optical disk player or a portable optical disk player.

Furthermore, the vibrations or shocks damping device is preferably applied to the portable magnetic disk readout/write apparatus, such as a notebook computer or palm-top computer.

We claim:

1. A vibration-damping housing structure for an optical disk player, comprising:

an external housing, a deck housing located in said external housing for supporting an optical disk player, said deck housing including first and second substantially vertical side walls, each of said side walls including a first surface defining a first vertical plane and having a plurality of first holes, said external housing including second surfaces facing respective ones of said first surfaces, each of said second surfaces defining a second vertical plane and having second holes disposed opposite from, and spaced from, respective ones of said first holes of said deck housing, whereby said first and second holes of said external housing and said deck housing form pairs of substantially horizontally spaced, aligned first and second holes, and vibration damping members extending between said external housing and said deck housing, each of said vibration damping members comprising a container formed of an elastic material filled with a fluid, each of said vibration damping members being mounted in one of said pairs of aligned first and second holes such that said fluid is situated in both holes of said pair, said fluid disposed on opposite horizontal sides of each of said first and second planes.

2. The housing structure according to claim 1, wherein said fluid comprises a gas under a pressure which exceeds atmospheric pressure.

3. The housing structure according to claim 1, wherein said fluid is a gas.

4. The housing structure according to claim 1, wherein said fluid is liquid.

5. The housing structure according to claim 1, wherein said external housing includes third and fourth side walls situated opposite from, and spaced from, said first and second side walls, respectively, said external housing including a first bracket disposed between said first and third side walls, and a second bracket disposed between said second and fourth side walls, said holes of said external housing being formed in said brackets.

6. The housing structure according to claim 1, wherein each of said holes comprises a through-hole.

7. The housing structure according to claim 1, wherein each of said holes comprises a concave depression.

8. The housing structure according to claim 1, wherein each of said holes includes edges extending into respective grooves formed in said containers of said vibration damping members.

9. The housing structure according to claim 1, wherein each of said vibration damping members is secured in its respective holes by an adhesive.

* * * * *